(12) United States Patent
Kerselaers et al.

(10) Patent No.: US 10,965,346 B2
(45) Date of Patent: Mar. 30, 2021

(54) NEAR-FIELD DEVICE

(71) Applicant: NXP B.V., Eindhoven (NL)

(72) Inventors: Anthony Kerselaers, Herselt (BE);
Pieter Verschueren, Langdorp (BE)

(73) Assignee: NXP B.V., Eindhoven (NL)

( * ) Notice: Subject to any disclaimer, the term of this patent is extended or adjusted under 35 U.S.C. 154(b) by 581 days.

(21) Appl. No.: 15/602,160

(22) Filed: May 23, 2017

(65) Prior Publication Data
US 2018/0343035 A1 Nov. 29, 2018

(51) Int. Cl.
*H04B 5/00* (2006.01)
*G01N 27/24* (2006.01)
*H01Q 1/52* (2006.01)

(52) U.S. Cl.
CPC .......... *H04B 5/0012* (2013.01); *G01N 27/24* (2013.01); *H01Q 1/525* (2013.01); *H04B 5/0031* (2013.01); *H04B 5/0043* (2013.01)

(58) Field of Classification Search
CPC ...... H04B 5/0012; H04B 5/0081; A61B 5/05; A61B 5/0507; A61B 5/14532; A61B 5/14546; G01N 22/00; G01N 33/536; G01N 2035/00346; G01N 2333/75; Y10S 436/805; Y10S 436/806
See application file for complete search history.

(56) References Cited

U.S. PATENT DOCUMENTS

| | | |
|---|---|---|
| 2,438,795 A | 3/1948 | Wheeler |
| 2,685,068 A | 7/1954 | Goubau |
| 4,639,669 A | 1/1987 | Howard et al. |
| 4,743,916 A | 5/1988 | Bengeult |
| 5,341,100 A | 8/1994 | Taylor |
| 5,341,102 A | 8/1994 | Akiyama et al. |
| 5,973,503 A | 10/1999 | Kuipers et al. |
| 6,426,629 B1 | 7/2002 | Edgson et al. |
| 6,691,563 B1 | 2/2004 | Trabelsi et al. |
| 7,009,471 B2 | 3/2006 | Elmore |
| 7,567,154 B2 | 7/2009 | Elmore |
| 8,664,965 B2 | 3/2014 | Calciolari et al. |
| 8,724,835 B2 | 5/2014 | Kerselaers et al. |
| 9,042,812 B1 | 5/2015 | Bennett et al. |
| 9,197,956 B2 | 11/2015 | Iseberg et al. |
| 9,197,986 B1 | 11/2015 | Kerselaers et al. |
| 9,262,711 B2 | 2/2016 | Gallo et al. |

(Continued)

FOREIGN PATENT DOCUMENTS

| | | |
|---|---|---|
| CN | 1710412 A | 12/2005 |
| CN | 104655656 A | 5/2015 |

OTHER PUBLICATIONS

RF cavities, Nassiri, 2010 http://uspas.fnal.gov/materials/10MIT/Lecture12.pdf (Year: 2010).*

(Continued)

*Primary Examiner* — Jianxun Yang

(57) ABSTRACT

A near-field device, including: a near-field receiver coupled to a near-field receiver antenna and a decoder circuit; wherein the near-field receiver antenna is configured to be capacitively coupled at a first location on a conductive structure; wherein the near-field receiver antenna is configured to receive a near-field signal from the conductive structure through the receiver's capacitive coupling; and wherein the decoder circuit is configured to detect variations in the near-field signal.

20 Claims, 8 Drawing Sheets

(56) References Cited

U.S. PATENT DOCUMENTS

| | | | |
|---|---|---|---|
| 2002/0155625 A1* | 10/2002 | Chapman | G01N 22/00 436/536 |
| 2006/0063488 A1 | 3/2006 | Hraby et al. | |
| 2006/0235633 A1* | 10/2006 | Simons | G01R 29/0892 702/65 |
| 2008/0306359 A1* | 12/2008 | Zdeblick | A61B 5/0028 600/302 |
| 2008/0319285 A1* | 12/2008 | Hancock | A61B 5/05 600/309 |
| 2016/0047768 A1 | 2/2016 | Dabelstein et al. | |
| 2016/0110639 A1 | 4/2016 | Finn et al. | |

OTHER PUBLICATIONS

Wikipedia; "Magnetic particle inspection"; retrieved from the internet on May 22, 2017 https://en.wikipedia.org/wiki/Magnetic_particle_inspection; 6 pages May 22, 2017.

Restriction/Election, U.S. Appl. No. 15/642,168; 6 pages (dated Feb. 23, 2018).

U.S. Appl. No. 15/642,168, filed; not yet published (Jul. 5, 2017).

Non Final Office Action U.S. Appl. No. 15/642,168; 24 pages (dated Jun. 28, 2018).

Diamond, G. et al., "A New Capacitive Imaging Technique for NDT", 9TH European Conference on NDT, ECNDT, Nov. 1, 2006, pp. 1-8, retrieved from the Internet at http://www.ndt.net/article/ecndt2006/doc/P229.pdf on Nov. 1, 2006.

Liu, Zheng et al., "Experimenting Capacitive Sensing Technique for Structural Integrity Assessment", 2017 IEEE International Conference on Industrial Technology (ICIT), Mar. 22, 2017, pp. 922-927, IEEE, Piscataway, NJ, USA.

Final Office Action U.S. Appl. No. 15/642,168; 17 pages (dated Oct. 9, 2018).

Notice of Allowance; U.S. Appl. No. 15/642,168; 5 pages (dated Jul. 3, 2019).

\* cited by examiner

NEAR-FIELD DEVICE

The present specification relates to systems, methods, apparatuses, devices, articles of manufacture and instructions for near-field signal analysis.

SUMMARY

According to an example embodiment, a near-field device, comprising: a near-field receiver coupled to a near-field receiver antenna and a decoder circuit; wherein the near-field receiver antenna is configured to be capacitively coupled at a first location on a conductive structure; wherein the near-field receiver antenna is configured to receive a near-field signal from the conductive structure through the receiver's capacitive coupling; and wherein the decoder circuit is configured to detect variations in the near-field signal.

In another example embodiment, another near-field device including a near-field transmitter is coupled to a near-field transmitter antenna and an encoder circuit; wherein the near-field transmitter antenna is configured to be capacitively coupled at a second location on the conductive structure; wherein the encoder circuit is configured to generate the near-field signal; and wherein the near-field transmitter antenna is configured to transmit the near-field signal to the conductive structure through the transmitter's capacitive coupling.

In another example embodiment, the near-field transmitter antenna is separated from the near-field receiver antenna by greater than two centimeters.

In another example embodiment, the near-field receiver antenna is configured to be capacitively coupled to the conductive structure using an air-gap between the conductive structure and an outside of the near-field device.

In another example embodiment, the near-field signal includes a carrier frequency that is ≤40 MHz.

In another example embodiment, the conductive structure includes at least one of: a pipe, a planar surface, a building girder, a vehicle chassis, a container, a metal box, a medicine bottle, a food package, a wire, or a tube.

In another example embodiment, the conductive structure includes a conductive material including at least one of: iron, copper, or carbon.

In another example embodiment, the conductive structure is a container having an inside and an outside; the container blocks RF radiation from entering the inside; and the container passes the near-field signal to the inside.

In another example embodiment, the container further includes an opening; the container passes the near-field signal to the inside through the opening; and the opening does not pass RF radiation.

In another example embodiment, the conductive structure is a container having an inside and an outside; the container blocks RF radiation from entering the inside; the container passes the near-field signal to the inside; and one of the near-field devices is outside of the container and one of the near-field devices is inside of the container.

In another example embodiment, the decoder circuit includes a degradation detector configured to interpret the variations in the near-field signal as a structural degradation in the conductive structure.

In another example embodiment, the structural degradation includes at least one of: a crack, a break, a bend, application of a coating to the conductive structure, a discontinuity, or an abnormal change in conductivity.

In another example embodiment, the degradation detector is configured to interpret the variations in the near-field signal as indicating a structural degradation if there is a difference between a previously received H-Field signal and a currently received H-Field signal.

In another example embodiment, the degradation detector is configured to interpret the variations in the near-field signal as indicating a structural degradation if there is a difference between a previously received E-Field signal and a currently received E-Field signal.

In another example embodiment, the decoder circuit includes a communications circuit configured to interpret the variations in the near-field signal as a communications signal transmitted by another near-field device.

According to an example embodiment, a method of processing a near-field signal, comprising: capacitively coupling a near-field device at a first location on a conductive structure; receiving a near-field signal at the near-field device from the conductive structure through the capacitive coupling; and detecting variations in the near-field signal.

In another example embodiment, capacitively coupling another near-field device at a second location on the conductive structure; and transmitting the near-field signal at the another near-field device to the conductive structure through the capacitive coupling of the another near-field device.

In another example embodiment, interpreting the variations in the near-field signal as a structural degradation in the conductive structure.

In another example embodiment, interpreting the variations in the near-field signal as a communications signal transmitted by another near-field device.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
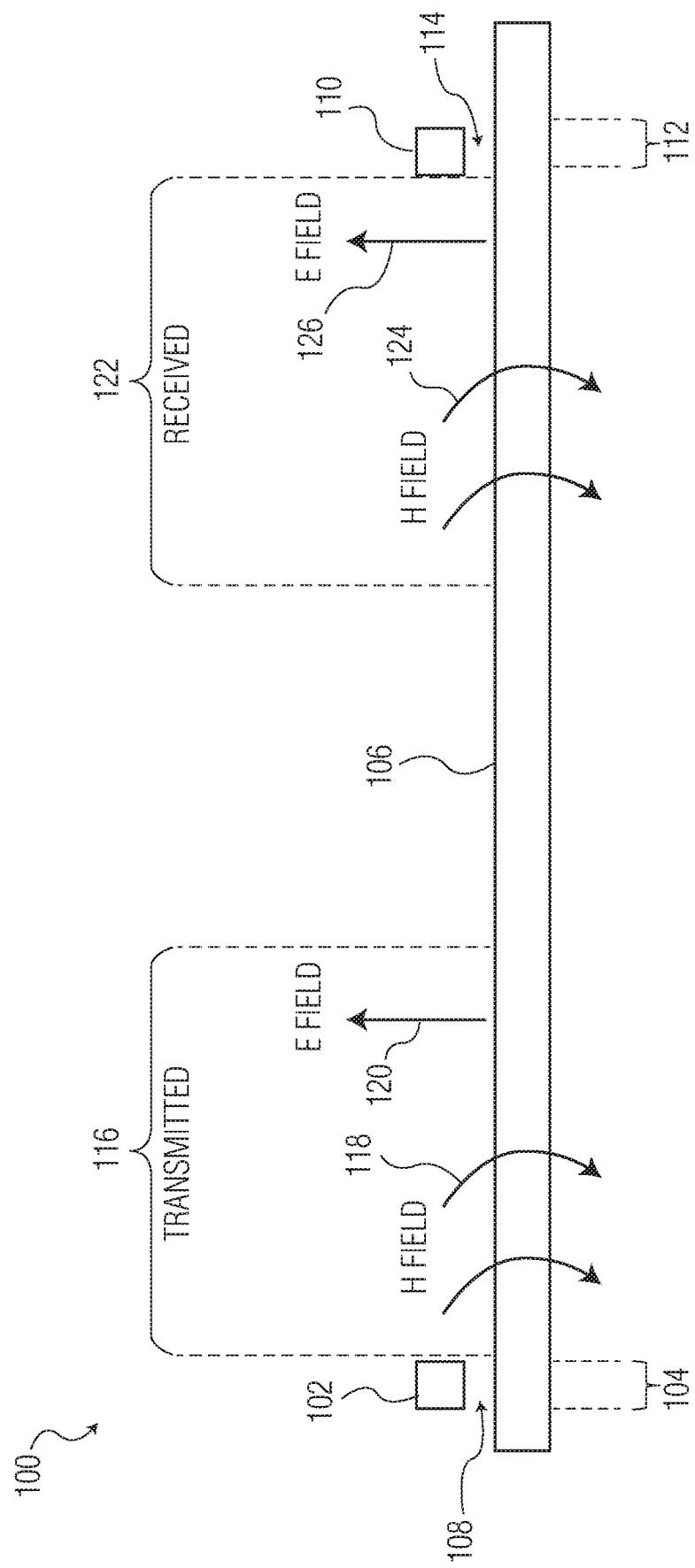
FIG. 1 is an example first application of a set of near-field devices.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Whereas RF wireless communication may be accomplished by propagating an RF plane wave through free space, near-field electromagnetic induction (NFEMI) devices utilize non-propagating quasi-static fields. The quasi-static characteristic of the fields is the result of antenna dimensions in combination with the carrier frequency. The majority of the energy is stored in the form of magnetic and electric fields and only a small amount of RF energy propagates in free space.

Small antenna geometries compared with the carrier wavelength are candidate for near field communication since they do not generate radiating waves in free space. Such an antenna can be a coil antenna that allows near field magnetic induction (NFMI). Other antennas communicate by means of both magnetic (H) and electric (E) near-fields via near field electromagnetic induction (NFEMI).

To be discussed herein are example embodiments of a near-field electromagnetic induction (NFEMI) device which when capacitively coupled to a conductive structure can be used to communication or perform conductive structure integrity checks by means of a combination of magnetic and electric near-fields.

For example, two communication devices which each include near-field devices, can be positioned at different locations along a conductive structure and are able both wireless communicate with each other and detect any stresses or damages to the conductive structure.

Various embodiments of the near-field device may include: control circuitry, microprocessors, microcontrollers, digital signal processors, data processing units, human interface units, and antennas. Such antennas when in close proximity to a conductive structure will generate fields that are substantially confined near the conductive structure, thus providing a strong near-field signal for either communication or conductive structure integrity checks.

The near-field device to be discussed can be used in different possible applications, including industrial applications. For example the near-field device can be used to communicate with sensors inside a secure conductive container perhaps including medicine or food, and/or communicate at distances over conductive structures such as: metal pipes, building girders or I-beams, even if encased in concrete.

FIG. 1 is an example first application 100 of a set of near-field devices 102, 110. The example first application 100 includes the first near-field device 102 (e.g. for near-field signal transmission and/or reception) positioned at a first location 104 along a conductive structure 106. The first near-field device 102 includes a near-field transmitter antenna (not shown), a transmitter circuit (not shown), an encoder circuit (not shown) and is separated from the conductive structure 106 by a dielectric 108 (e.g. air-gap for capacitive coupling).

The example first application 100 also includes a second near-field device 110 (e.g. for near-field signal reception and/or transmission) positioned at a second location 112 along the conductive structure 106. The second near-field device 110 includes a near-field receiver antenna (not shown), a receiver circuit (not shown), a decoder circuit (not shown) and a dielectric 114 (e.g. air-gap for capacitive coupling).

The first near-field device 102 uses the encoder to generate a transmitted near-field signal 116 having an H-Field 118 (i.e. magnetic field) component and an E-Field 120 (i.e. electric field) component. The first near-field device 102 transmits the near-field signal 116 to the conductive structure 106 through the transmitter's dielectric 108 (i.e. capacitive coupling).

The second near-field device 110 receives a near-field signal 122 from the conductive structure 106 through the receiver's dielectric 114 (i.e. capacitive coupling). This received near-field signal 122 corresponds to the transmitted near-field signal 116, but due to variations over the conductive structure 106, has an H-Field 124 (i.e. magnetic field) component and an E-Field 126 (i.e. electric field) component, which may or may not differ from the H-Field 118 and E-Field 120 components.

The H-field 118, 124 and E-field 120, 126 arrows in FIG. 1 illustrate the magnetic and electric near-fields along the conductive structure 106. The near-field transmitter antenna is designed so that the magnetic field is curved around the conductive structure 106. The electric field vector is perpendicular to the conductive structure 106 since the tube is conductive. The magnetic field and the electric field are distributed over the length of the conductive structure 106. The antenna of the second near-field device 110 is able to convert both H and E fields into voltages that can be processed by the receiver circuit in the second near-field device 110.

In some example embodiments, the dielectrics 108, 114 for capacitive coupling are air-gaps between the conductive structure 106 and the outside of the near-field devices 102, 110.

The decoder circuit in the second near-field device 110 detects and interprets these variations in the near-field signal 122. In this first application 100 and in further example embodiments (see below), the near-field devices 102, 110 can be used for communications wherein the decoder circuit includes a communications circuit configured to interpret the variations in the near-field signal as a communications signal transmitted by the near-field devices 102, 110.

The near-field transmitter antenna can be separated from the near-field receiver antenna over a range of distances (e.g. 20 cm to several meters).

In some NFMI and NFEMI embodiments, the near-field signal includes a carrier frequency that is below 30 MHz; however, other embodiments can use other carrier frequencies that permit near-field operation.

The conductive structure 106 in various embodiments can be at least one of: a pipe, a planar surface, a building girder, a vehicle chassis, a container, a metal box, a medicine bottle, a food package, a wire, or a tube. The near-field devices 102, 110 can be placed either inside or outside of these conductive structures 106. The conductive structure 106 can also be fabricated from a variety of conductive materials, including: iron, copper, or carbon.

Figure 2:
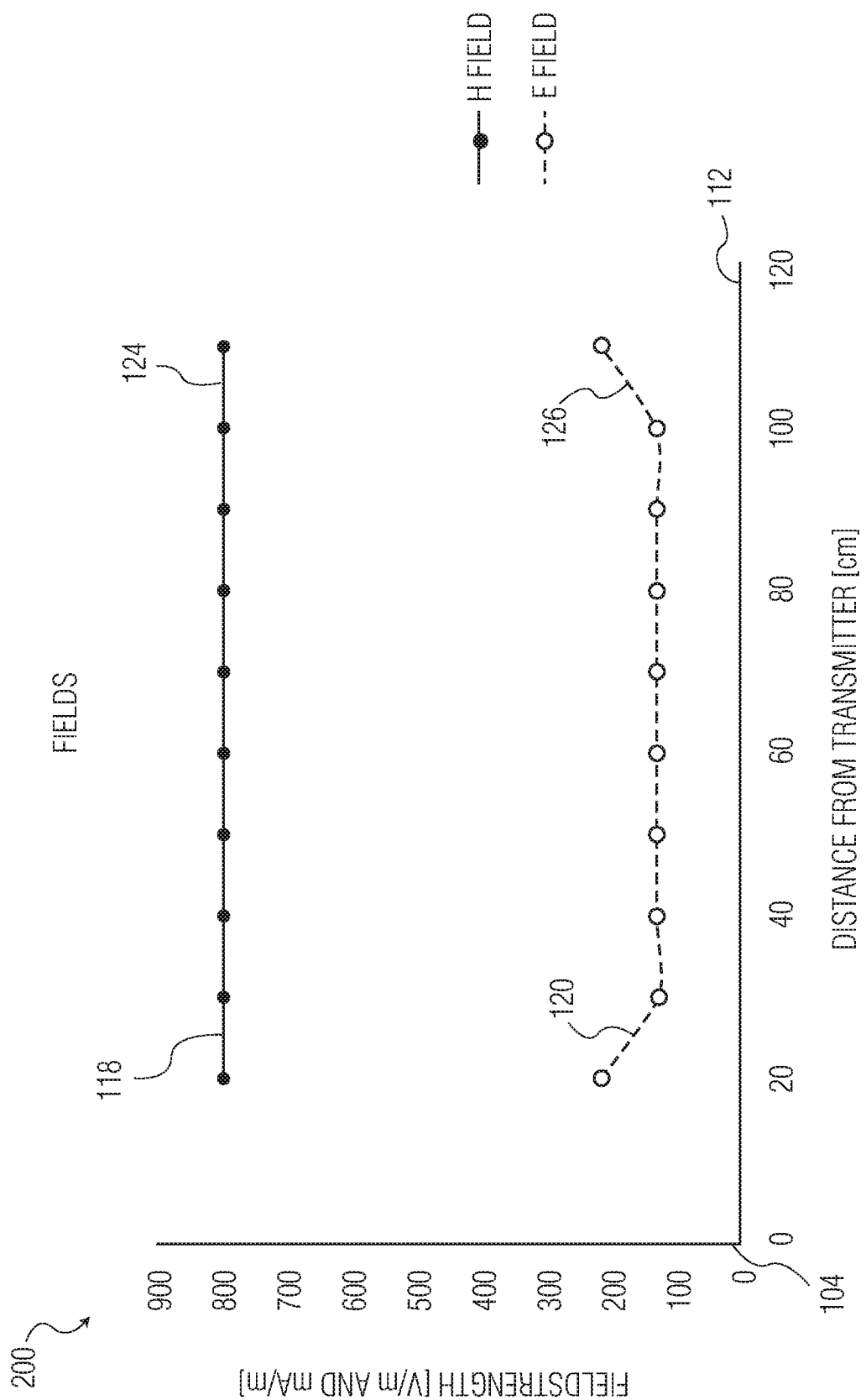
FIG. 2 are example near-field signals from the example first application of the set of near-field devices.

FIG. 2 are example near-field signals 200 from the example first application 100 of the set of near-field devices 102, 110 in FIG. 1. In is example 200 the first location 104 is at 0 cm and the second location 112 is at 120 cm. As the conductive properties of the conductive structure 106 decrease the H-field remains linear (if no breaks) but shifts "down" and E-field slants down as distance from the first near-field device 102 (e.g. transmitter) increases.

FIG. 2 shows an example baseline reading for the magnetic and electric fields over the length of the conductive structure 106 at a first point in time. Subsequent readings at a later time can show degradation in the conductive structure

106, as will be discussed in FIG. 4. In this example, at less than 20 cm from the first near-field device 102, H-fields and E-fields are very complex so no integrity measurements here. However, a revised NFEMI antenna could reduce this region of complexity to less than 20 cm.

Figure 3:
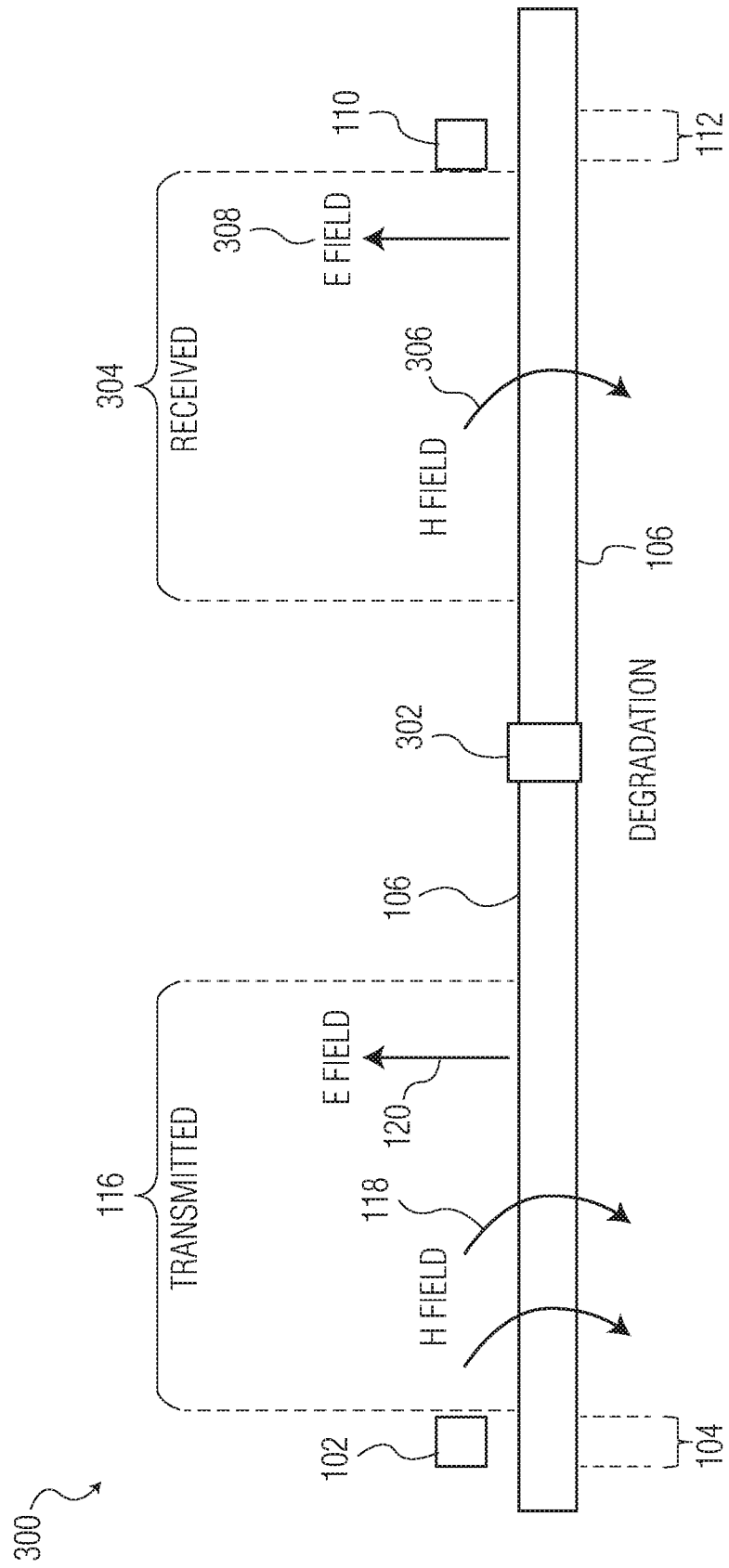
FIG. 3 is an example second application of the set of near-field devices.

FIG. 3 is an example second application 300 of the set of near-field devices 102, 110. In this second application 300 the near-field devices 102, 110 are used for structural inspection wherein the decoder circuit in the second near-field device 110 (e.g. receiver) includes a degradation detector configured to interpret the variations in the near-field signal as a structural degradation in the conductive structure 106 if there is a difference between a previously received near-field signal 122 and a currently near-field signal 304.

The first near-field device 102 in this example 300 continues to generate a transmitted near-field signal 116 having an H-Field 118 (i.e. magnetic field) component and an E-Field 120 (i.e. electric field) component. However, the second near-field device 110 receives a degraded near-field signal 304 having an H-Field 306 (i.e. magnetic field) component and an E-Field 308 (i.e. electric field) component substantially less than the H-Field 118 and E-Field 120 components. This is due to the degradation 302 along the conductive structure 106.

In some example embodiments, the structural degradation includes at least one of: a crack, a break, a bend, application of a coating to the conductive structure, a discontinuity, or abrupt change in conductivity.

Thus the set of near-field devices 102, 110 can perform structural inspections, assembly line quality control tasks, building support structure integrity measurements and so on, over varying distances (e.g. cm to meters to kilometers depending upon the near-field devices' 102, 110 link budget). For example, the near-field devices 102, 110 can perform skyscraper steel/iron structural girder inspection even if the girders are encased in concrete.

Figure 4:
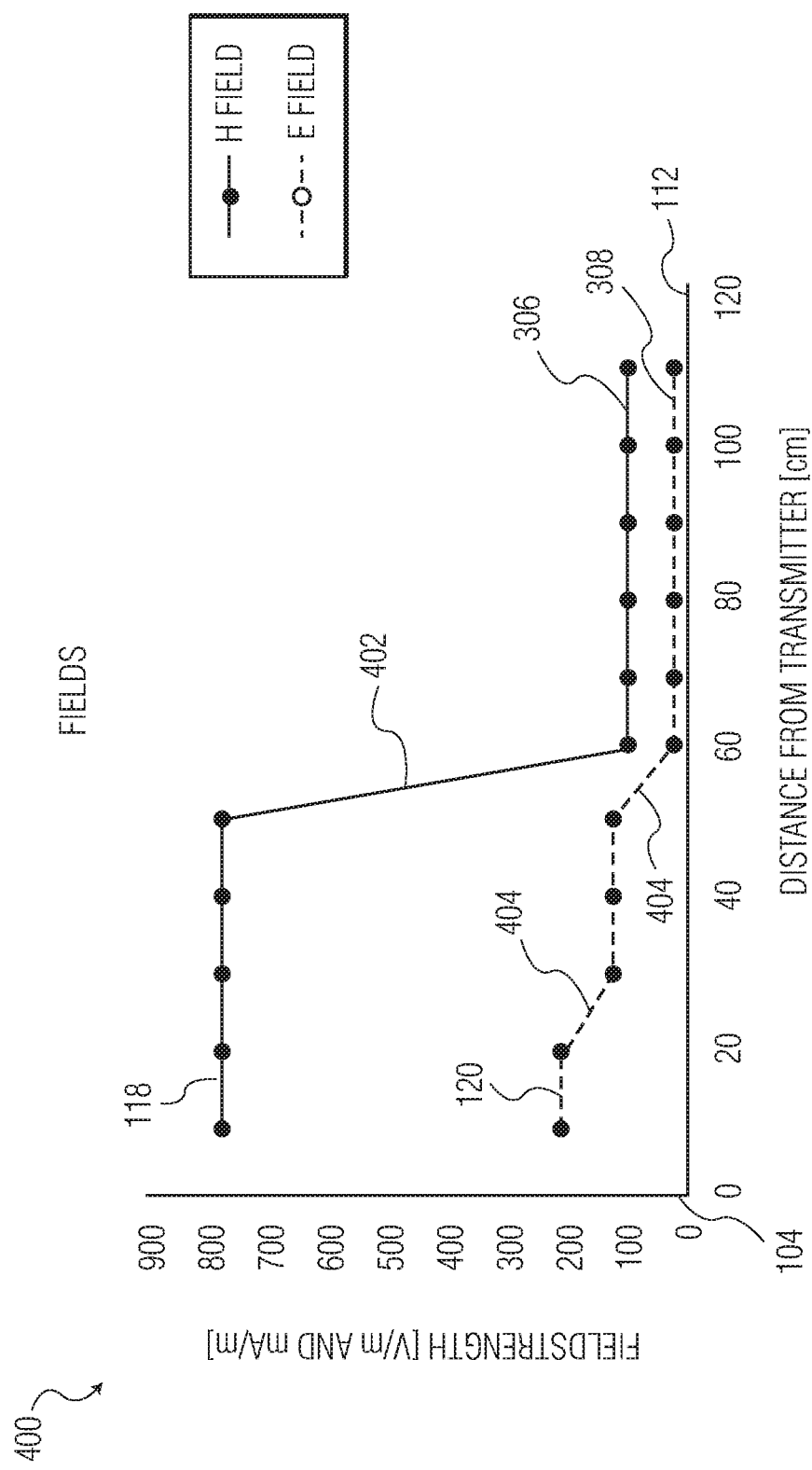
FIG. 4 are example near-field signals from the example second application of the set of near-field devices.

FIG. 4 are example near-field signals 400 from the example second application 300 of the set of near-field devices 102, 110. This Figure shows an example set of effects on the received near-field signal 304 (i.e. magnetic and electric fields) due to the degradation 302 of some sort between the 50 cm and 60 cm locations along the conductive structure 106.

The degradation 302 to the conductive structure 106 in this example is detectable by the decoder circuit in the second near-field device 110 by a difference between the previously received H-Field 124 and/or E-Field 126 (see FIG. 2) before the degradation 302 and the received H-Field 306 and/or E-Field 308 (see FIG. 4) after the degradation 302. The H-Field fall-off 402 (i.e. magnetic field component) and the E-Field fall-off 404 (i.e. electric field component) can be due to flux attenuation at the degradation 302 location.

Figure 5:
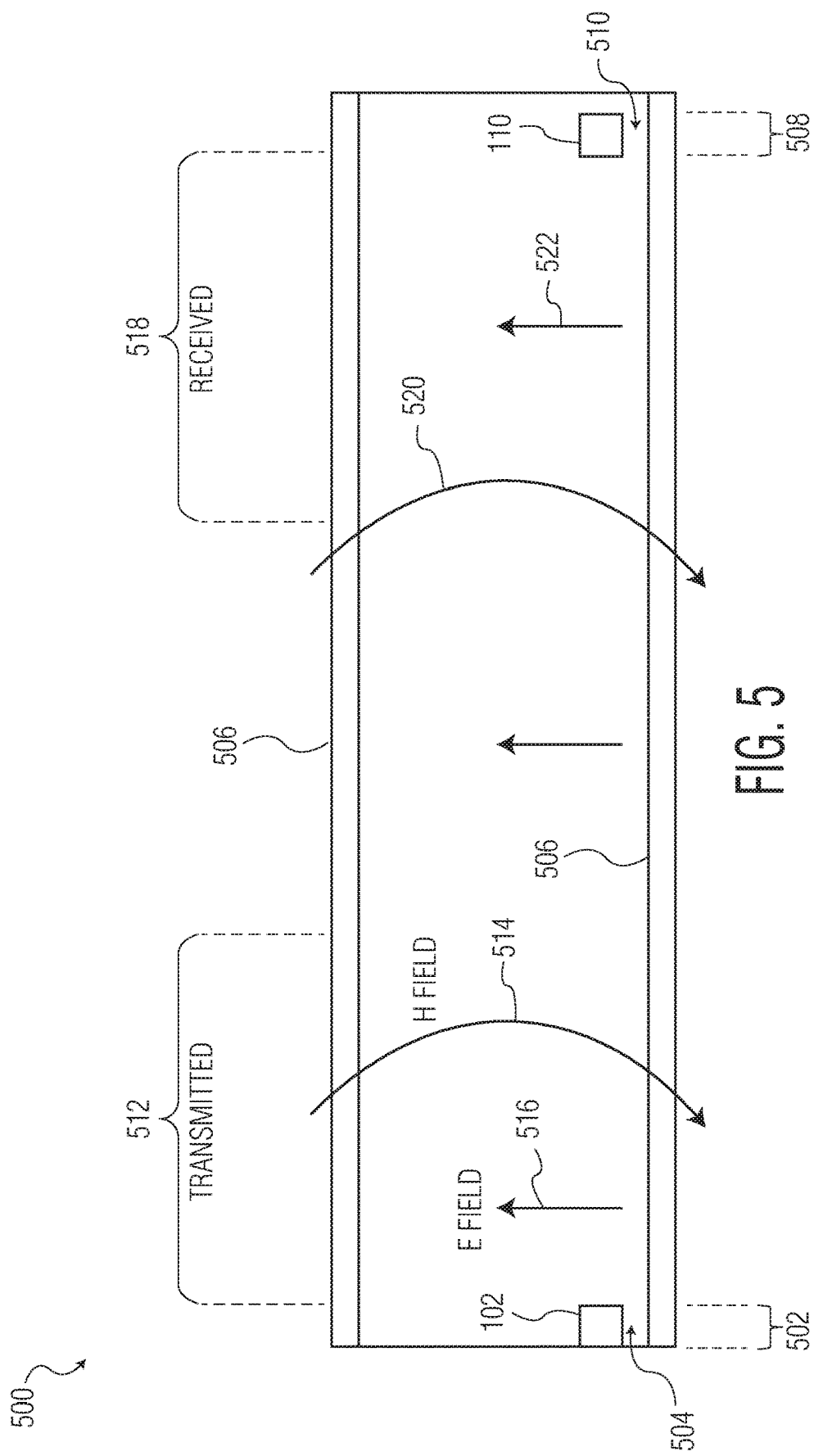
FIG. 5 is an example third application of the set of near-field devices.

FIG. 5 is an example third application 500 of the set of near-field devices 102, 110. The example third application 500 includes the first near-field device 102 positioned at a first location 502 along a conductive structure 506 (e.g. inside of a metal pipe) and separated from the conductive structure 506 (e.g. inside of a metal pipe) by a dielectric 504 (e.g. air-gap for capacitive coupling).

The example third application 500 also includes the second near-field device 110 positioned at a second location 508 along the conductive structure 506 and separated from the conductive structure 506 by a dielectric 510.

The first near-field device 102 generates a transmitted near-field signal 512 having an H-Field 514 (i.e. magnetic field component) and an E-Field 516 (i.e. electric field component). The second near-field device 110 receives a near-field signal 518 having an H-Field 520 (i.e. magnetic field component) and an E-Field 522 (i.e. electric field component).

Figure 6:
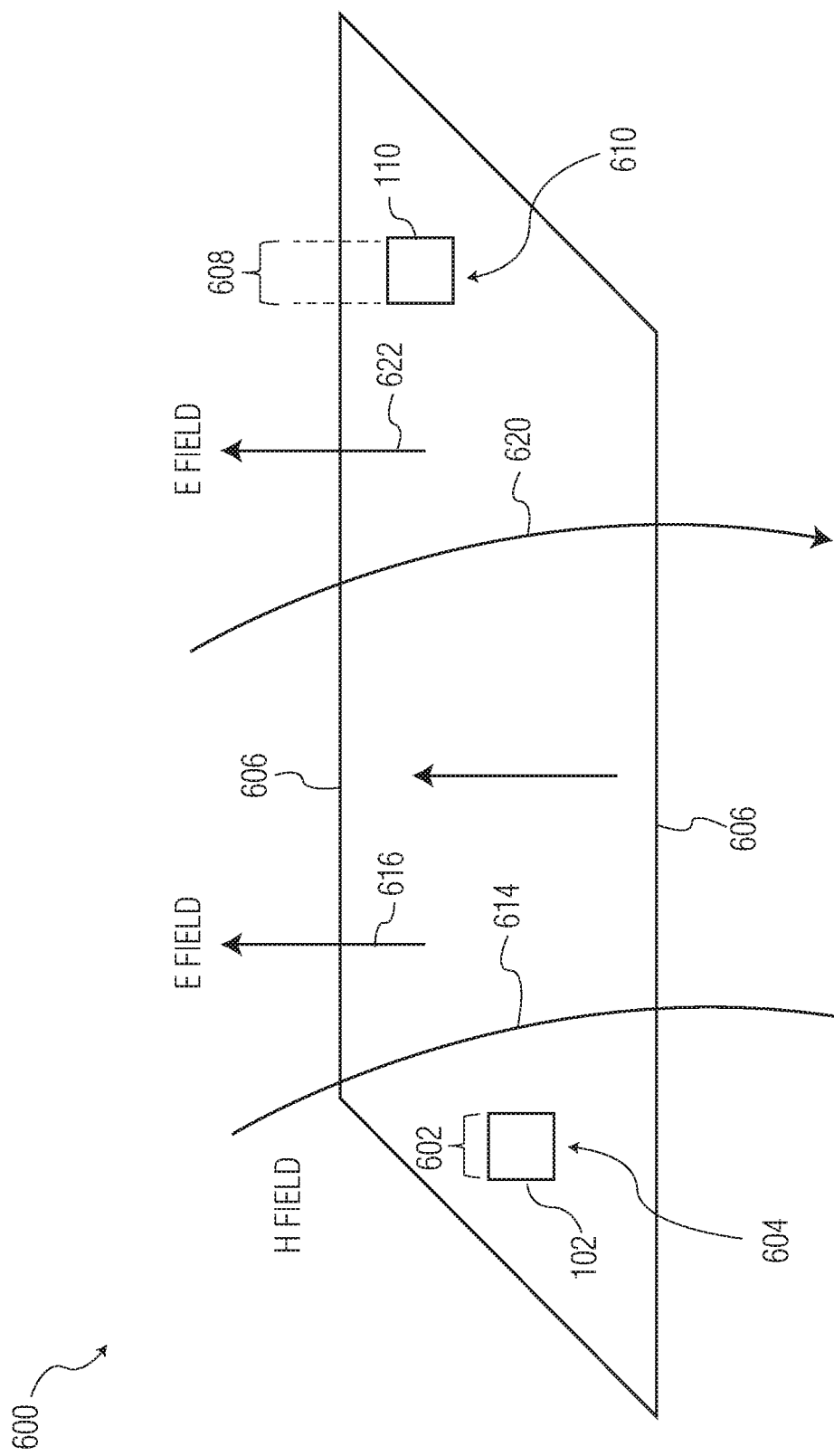
FIG. 6 is an example fourth application of the set of near-field devices.

FIG. 6 is an example fourth application 600 of the set of near-field devices 102, 110. The example fourth application 600 includes the first near-field device 102 positioned at a first location 602 along a conductive structure 606 (e.g. metal plate) and separated from the conductive structure 606 by dielectric 604.

The example fourth application 600 also includes the second near-field device 110 positioned at a second location 608 along the conductive structure 606 and separated from the conductive structure 606 by dielectric 610.

The first near-field device 102 generates a transmitted near-field signal having an H-Field 614 (i.e. magnetic field component) and an E-Field 616 (i.e. electric field component). The second near-field device 110 receives a near-field signal having an H-Field 620 (i.e. magnetic field component) and an E-Field 622 (i.e. electric field component).

Figure 7B:
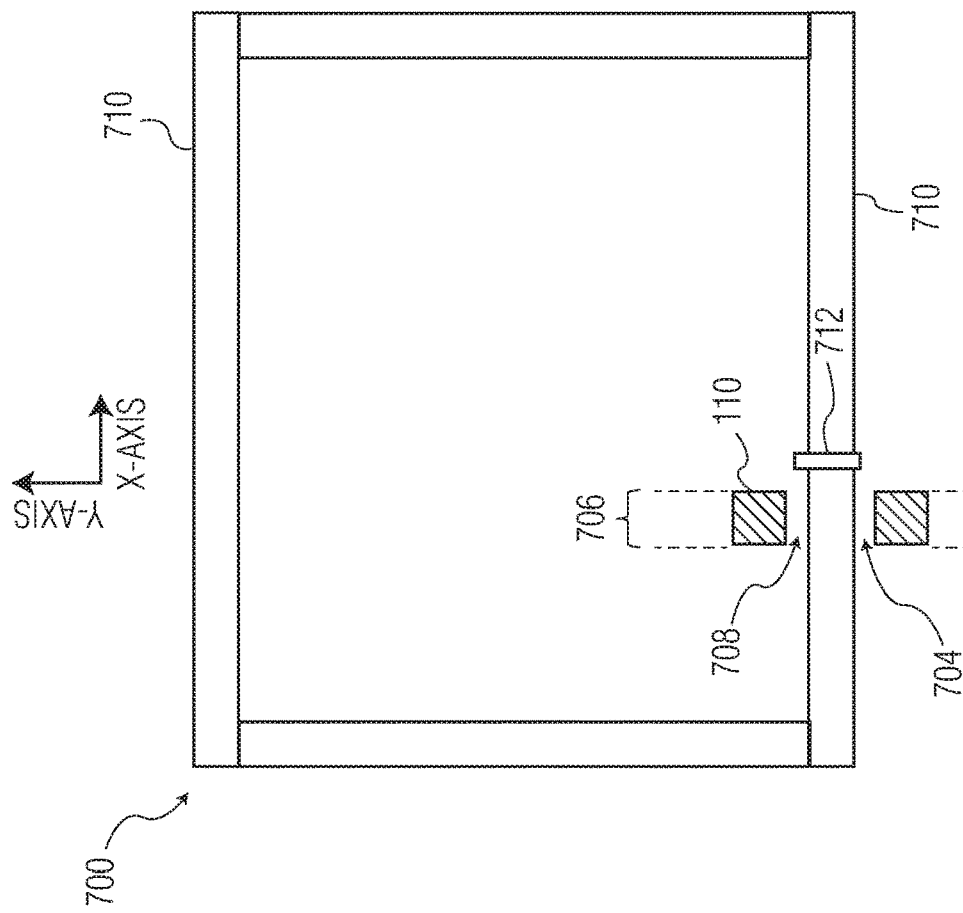
FIG. 7B is an example top view of the fifth application of the set of near-field devices.
Figure 7A:
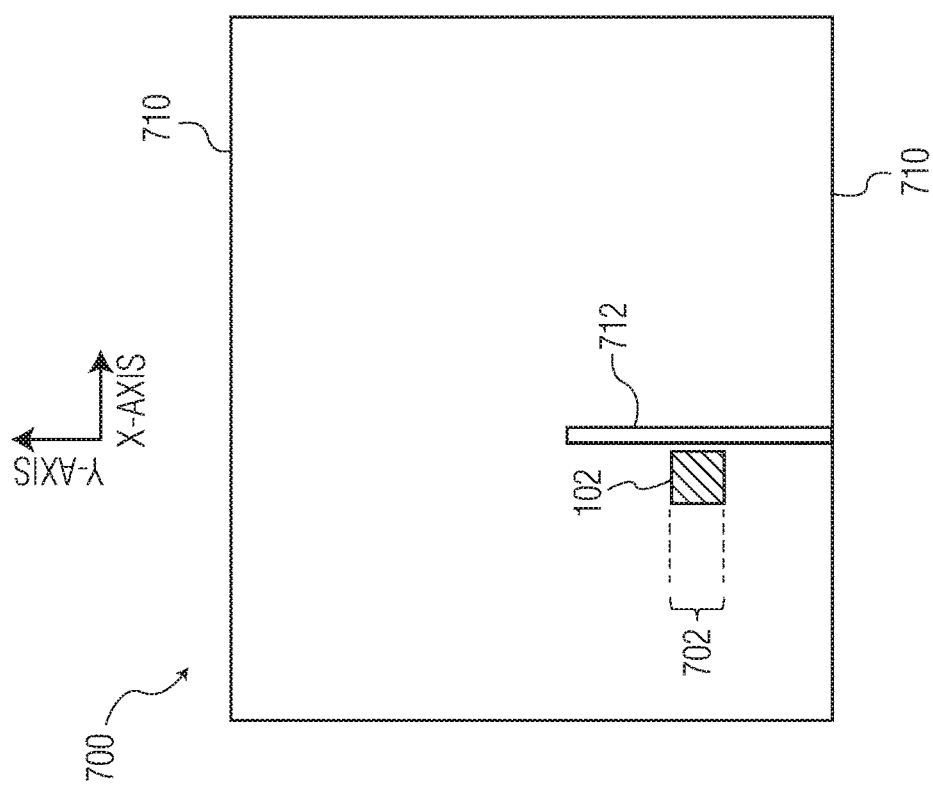
FIG. 7A is an example side view of a fifth application of the set of near-field devices.

FIG. 7A is an example side view of a fifth application 700 of the set of near-field devices 102, 110. FIG. 7B is an example top view of the fifth application 700 of the set of near-field devices 102, 110. In this example embodiment, the conductive structure 712 is a container, such as a metal box, or a secure medical container.

The example fifth application 700 includes the first near-field device 102 positioned at a first location 702 outside of a conductive structure 710 (e.g. metal container) and separated from the conductive structure 710 by dielectric 704. The second near-field device 110 is positioned at a second location 706 inside the conductive structure 710 and separated from the conductive structure 710 by dielectric 708.

An opening 712 between the inside and outside of the conductive structure 710 permits near-field signals to pass from the first near-field device 102 to the second near-field device 110. However, the opening 712 in some example embodiments blocks RF radiation from passing between the inside and outside of the conductive structure 710.

In some example embodiments, the conductive structure 712 substantially forms a Faraday Cage, thereby blocking RF radiation, but the opening 712 however permits near-field signals to pass. In some example embodiments, the near-field devices 102, 110 are positioned close to the opening 712 for better signal reception.

Figure 8:
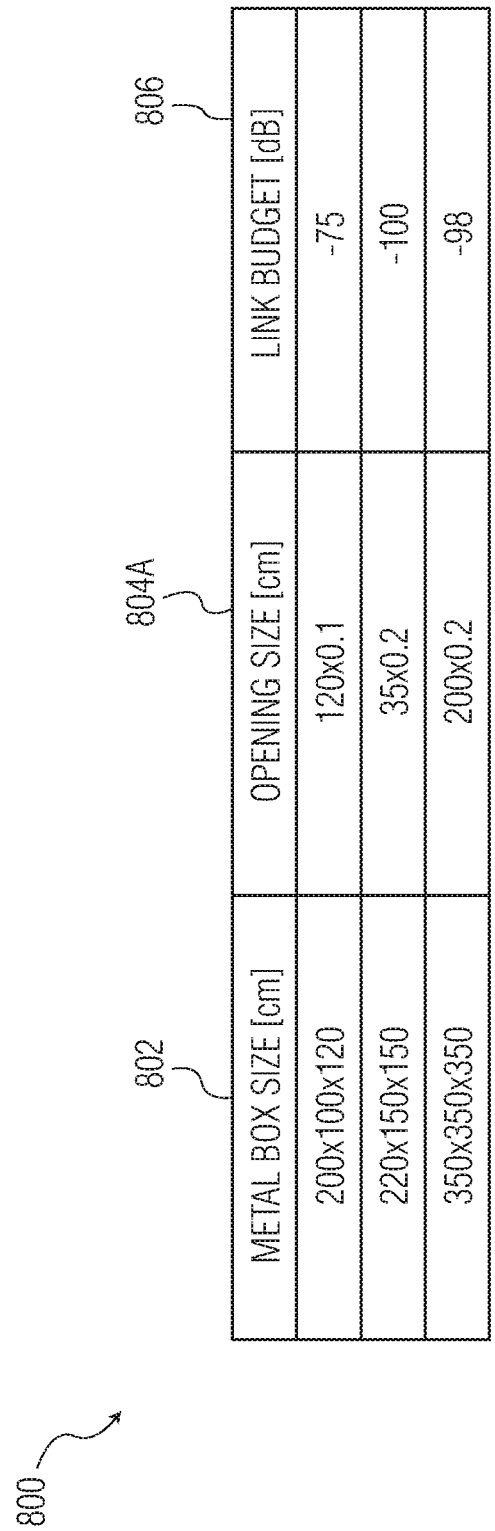
FIG. 8 is an example link-budget table for the near-field signals communicating through an opening from the example fifth application of the set of near-field devices.

FIG. 8 is an example link-budget table 800 for the near-field signals communicating through the opening 712 in the example fifth application 700. The example link-budget table 800 shows signal strength losses in dB for variously sized conductive structures 712 (e.g. metal containers).

Shown in the table 800 are example link budgets 806 for various metal box sizes 802 and openings 804. In this example, the near-field devices 102, 110 were placed close to the opening 712. The link budget is defined by:

$$\text{Link Budget [dB]} = 20\log_{10}\left(\frac{VRx}{VTx}\right).$$

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field device, comprising:
a near-field receiver coupled to a near-field receiver antenna and a decoder circuit; wherein the near-field receiver antenna is configured to be capacitively coupled at a first location on a conductive structure and receive a non-propagating quasi-static magnetic near-field signal and a non-propagating quasi-static electric near-field signal from the conductive structure through the receiver's capacitive coupling, wherein the decoder circuit includes a degradation detector that is configured to interpret variations in the magnetic and electric near-field signals as a structural degradation in the conductive structure.

2. The near-field device of claim 1, further comprising:
another near-field device including a near-field transmitter coupled to a near-field transmitter antenna and an encoder circuit; wherein the near-field transmitter antenna is configured to be capacitively coupled at a second location on the conductive structure, the encoder circuit is configured to generate the non-propagating quasi-static magnetic and electric near-field signals, and the near-field transmitter antenna is configured to transmit the non-propagating quasi-static magnetic and electric near-field signals to the conductive structure through the transmitter's capacitive coupling.

3. The near-field device of claim 2, wherein the near-field transmitter antenna is separated from the near-field receiver antenna by greater than two centimeters.

4. The device of claim 1: wherein the near-field receiver antenna is configured to be capacitively coupled to the conductive structure using an air-gap between the conductive structure and an outside of the near-field device.

5. The device of claim 1: wherein the near-field signal includes a carrier frequency that is ≤40 MHz.

6. The device of claim 1: wherein the conductive structure includes at least one of: a pipe, a planar surface, a building girder, a vehicle chassis, a container, a metal box, a medicine bottle, a food package, a wire, or a tube.

7. The device of claim 1: wherein the conductive structure includes a conductive material including at least one of: iron, copper, or carbon.

8. The device of claim 1: wherein the conductive structure is a container having an inside and an outside; wherein the container blocks RF radiation from entering the inside; and wherein the container passes the near-field signal to the inside.

9. The device of claim 8: wherein the container further includes an opening; wherein the container passes the near-field signal to the inside through the opening; and wherein the opening does not pass RF radiation.

10. The device of claim 2: wherein the conductive structure is a container having an inside and an outside; wherein the container blocks RF radiation from entering the inside; wherein the container passes the near-field signal to the inside; and wherein one of the near-field devices is outside of the container and one of the near-field devices is inside of the container.

11. The near-field device of claim 1, wherein the decoder circuit includes a degradation detector configured to interpret the variations in the non-propagating quasi-static magnetic and electric near-field signals as a structural degradation in the conductive structure.

12. The near-field device of claim 11, wherein the structural degradation includes at least one of: a crack, a break, a bend, application of a coating to the conductive structure, a discontinuity, or an abnormal change in conductivity.

13. The near-field device of claim 11, wherein the degradation detector is configured to interpret the variations in the non-propagating quasi-static magnetic and electric near-field signals as indicating the structural degradation after there is a difference between a previously received magnetic near-field signal and a currently received magnetic near-field signal.

14. The near-field device of claim 11, wherein the degradation detector is configured to interpret the variations in the non-propagating quasi-static magnetic and electric near-field signals as indicating the structural degradation after there is a difference between a previously received electric near-field signal and a currently received electric near-field signal.

15. The near-field device of claim 1, wherein the decoder circuit includes a communications circuit configured to interpret the variations in the non-propagating quasi-static magnetic and electric near-field signals as a communications signal transmitted by another near-field device.

16. A method of processing a near-field signal, comprising:
capacitively coupling a near-field device at a first location on a conductive structure;

receiving a non-propagating quasi-static magnetic near-field signal and a non-propagating quasi-static electric near-field signal at the near-field device from the conductive structure through the capacitive coupling; and detecting, with a degradation detector, variations in the non-propagating quasi-static magnetic and electric near-field signals, wherein the variations are interpreted as a structural degradation in the conductive structure.

17. The method of claim 16, further comprising:

capacitively coupling another near-field device at a second location on the conductive structure; and transmitting the non-propagating quasi-static magnetic and electric near-field signals at the another near-field device to the conductive structure through the capacitive coupling of the another near-field device.

18. The method of claim 16: interpreting the variations in the near-field signal as a structural degradation in the conductive structure.

19. The method of claim 16, further comprising:

interpreting the variations in the magnetic and electric near-field signals as a communications signal transmitted by another near-field device.

20. The near-field device of claim 1, wherein the non-propagating quasi-static magnetic near-field signal has a magnetic field vector curved around the conductive structure and the non-propagating quasi-static electric near-field signal has an electric field vector perpendicular to the conductive structure.

* * * * *